Aug. 23, 1932.  T. BOYD  1,873,179
COTTON DISTRIBUTING MECHANISM
Filed March 3, 1931  2 Sheets-Sheet 1
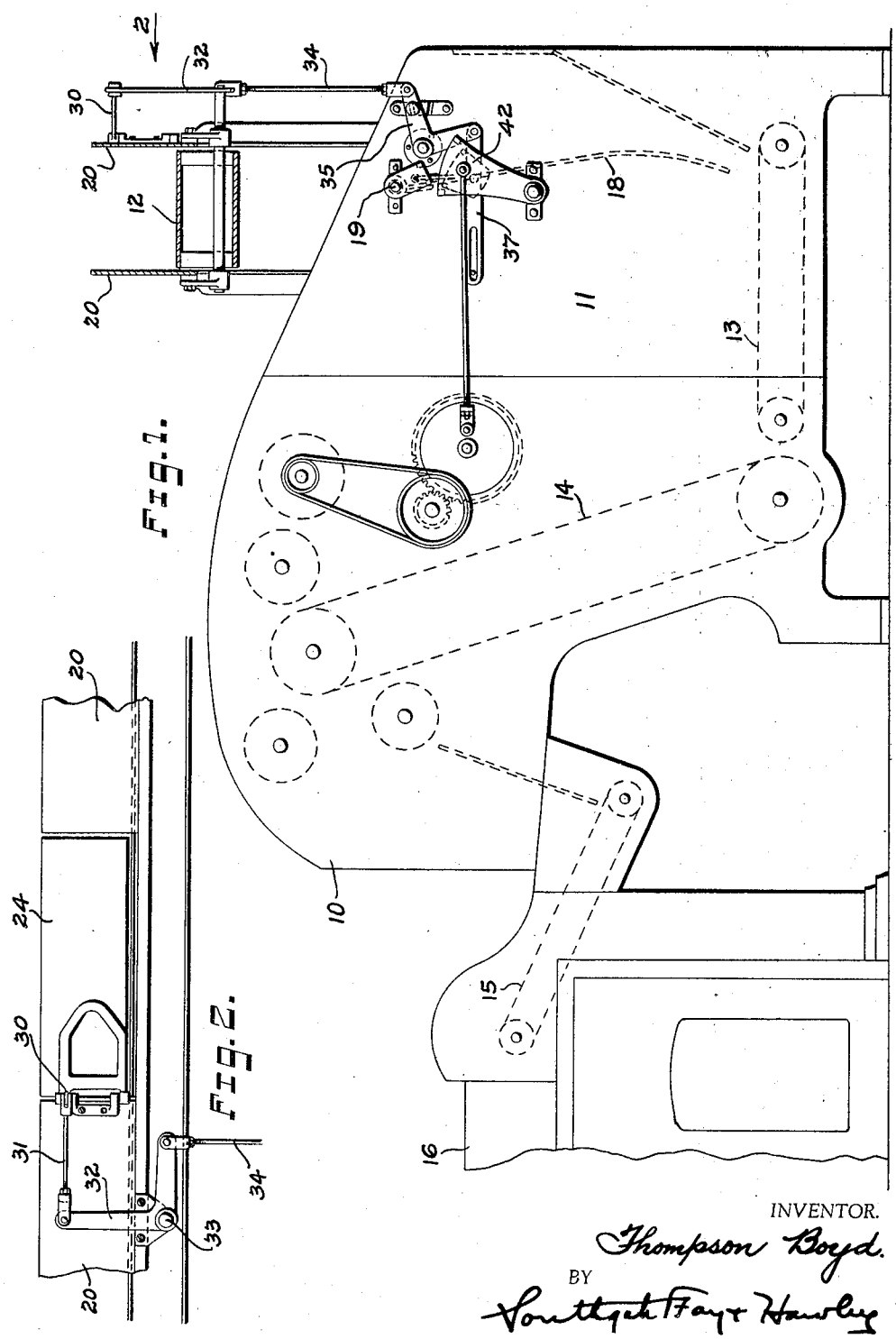
INVENTOR.
Thompson Boyd.
BY
Southgate Fay & Hawley
ATTORNEYS.

Aug. 23, 1932.  T. BOYD  1,873,179
COTTON DISTRIBUTING MECHANISM
Filed March 3, 1931   2 Sheets-Sheet 2
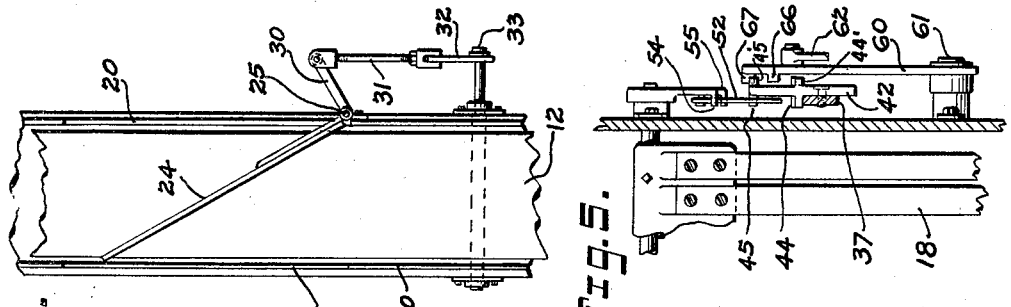

Patented Aug. 23, 1932

1,873,179

UNITED STATES PATENT OFFICE

THOMPSON BOYD, OF WHITINSVILLE, MASSACHUSETTS, ASSIGNOR TO WHITIN MACHINE WORKS, OF WHITINSVILLE, MASSACHUSETTS, A CORPORATION OF MASSACHUSETTS

COTTON DISTRIBUTING MECHANISM

Application filed March 3, 1931. Serial No. 519,885.

This invention relates to mechanism for distributing cotton or other fibrous material to a series of cotton feeders or similar machines. Such mechanism commonly comprises a belt conveyor which receives the cotton as it is delivered from the picker room and which transports the cotton to a plurality of hoppers, each of which is associated with a feeder for a cotton opener or breaker lapper. Gates are provided adjacent the conveyor for diverting cotton to the different openers or lappers and my present invention relates to the provision of improved and simplified mechanism for selectively opening and closing these gates.

My invention further relates to arrangements and combinations of parts which will be hereinafter described and more particularly pointed out in the appended claims.

A preferred form of the invention is shown in the drawings, in which

Fig. 1 is a side elevation of a cotton feeder having my improvements applied thereto;

Fig. 2 is a detail end elevation, looking in the direction of the arrow 2 in Fig. 1;

Fig. 3 is an enlarged side elevation of my improved gate actuating mechanism;

Fig. 4 is a detail plan view of a portion of the conveyor and parts associated therewith;

Fig. 5 is a sectional elevation, taken along the line 5—5 in Fig. 3; and

Fig. 6 is a detail view showing certain of the parts appearing in Fig. 3 but in different positions.

Referring to the drawings, I have shown a cotton feeder 10 of a usual type and comprising a hopper 11 adapted to receive cotton from a conveyor belt 12 and to feed cotton by a horizontal conveyor 13 to an inclined conveyor 14 by which the cotton is forwarded to a conveyor 15 associated with a breaker or lapper 16.

A feeler fork 18 is mounted on a cross shaft 19 and is swung to the right in Fig. 1 by an accumulation of cotton in the hopper 11. The conveyor belt 12 travels between side wall members 20 (Figs. 1 and 2), one side of which is cut away to provide an opening 22 above each of a series of feeders 10. A gate or deflector 24 is pivoted at 25 to the side wall 20 opposite each opening 22 but is normally swung back out of the path of the cotton on the conveyor 12. When it is desired to deliver cotton to a particular feeder 10, the corresponding gate 24 is moved to the position indicated in Fig. 4, in which position cotton is deflected through the adjacent opening 22 to the associated hopper 11.

The parts thus far described are of a usual commercial construction and in themselves form no part of my present invention, which relates particularly to the mechanism for selectively controlling and actuating the gates 24.

Each gate 24 is provided with an arm 30 (Fig. 4) extending perpendicular to the surface of the gate and connected by a link 31 to a bell crank 32 mounted upon a fixed pivot 33 (Fig. 2). The bell crank 32 is in turn connected by a link 34 to a second bell crank 35 (Fig. 3) pivoted at 36 on the frame of the feeder 10.

A bar 37 is pivoted at 38 to the depending arm of the bell crank 35 and is provided with a slot 39 to receive a fixed pin 40. A friction device 41 may be provided to prevent accidental displacement of the bell crank 35 and the connected gate 24.

A rocker plate 42 (Fig. 3) is pivoted at 43 on the slotted bar 37 and is provided at each side edge with rearwardly and forwardly projecting lugs 44—45 and 44'—45' (Fig. 5).

An arm 50 is fixed to the rock shaft 19 which supports the feeler fork 18 and is provided with a finger 52 loosely pivoted thereon at 53 and swinging between rearwardly extending lugs 54 and 55.

An actuating member 60 is mounted on a fixed pivot 61 and is connected by a link 62 to a crank-pin 63 in a continuously rotated gear 64 by which the actuating member 60 is regularly oscillated. The member 60 is also provided with a pair of rearwardly projecting lugs 66 and 67.

Having described the details of construction of my improved mechanism, the method of operation thereof is as follows:

The normal position of the parts is as shown in Figs. 1 and 2, with the hopper 11 full and the gate 24 swung back to inoperative position. The feeler fork 18 has been moved to the right by the accumulation of cotton in the hopper 11. It will be noted that the slotted bar 37 is in its extreme right hand position and that the rocker plate 42 is also tipped to the right.

Assuming now that the supply of cotton in the hopper 11 becomes depleted, the feeler fork 18 will be swung to the left by the action of a weight W supported on the rock shaft 19. This movement of the feeler fork 18 causes corresponding movement of the arm 50 (Fig. 6) to the left, carrying with it the finger 52 which is pivoted thereon. As the movement of the arm 50 continues, the lug 55 on the arm 50 engages the finger 52 and forces it against the lug 44 of the rocker plate 42, turning the rocker plate about its pivot 43 on the slotted bar 37. When the rocker plate has been turned sufficiently, it falls by gravity to a position determined by engagement of the lug 44 with the upper edge of the bar 37 (Fig. 3). This turning movement elevates the corner of the rocker plate 42 which is adjacent the lugs 45—45′, so that the lug 45′ comes into the path of the lug 67 on the actuating member 60. The rocker plate 42 and slotted bar 37 are thereafter forced bodily to the left by the lug 67 of the actuating member 60 until the member 60 reaches its limit of movement.

At this time the parts have assumed the position shown in Fig. 3 and the gate 24 has been moved to the operative position shown in Fig. 4, in which it deflects cotton through the adjacent opening 22 into the associated hopper 11. As the hopper fills with cotton, the fork 18 is pushed toward the position shown in Fig. 1, causing movement of the finger 52 in the opposite direction and rocking the plate 42 to bring the corner of the plate adjacent the lugs 44—44′, into a position such that the lug 44′ is in the path of movement of the lug 66 on the actuating member 60. Thereupon the parts are restored to the inoperative position shown in Fig. 1.

I have thus provided very simple mechanism by which the feeler fork for each hopper controls power actuated mechanism for moving the corresponding gate 24 to operative or inoperative positions. These movements are effected with very slight load upon the feeler fork 18, which has no other function than to rock the plate 42 on its pivot 43, which rocking movement may be effected with the application of a very slight force.

The pivoted finger 52 swinging between the lugs 54 and 55 provides a lost motion connection which prevents operation of the mechanism upon slight variations in the cotton supply in the hopper.

It will be noted that the operation of the device is mechanical throughout and that the use of contacts or magnets or other electrical devices is entirely avoided.

Having thus described my invention and the advantages thereof, I do not wish to be limited to the details herein disclosed, otherwise than as set forth in the claim, but what I claim is:—

In cotton distributing mechanism, a hopper, a conveyor belt, a deflecting gate, an actuating member, means to give said actuating member regularly repeated actuating movements, a feeler mounted to rock in the hopper and positioned in accordance with the supply of cotton in said hopper, a movable supporting device mechanically connected to said gate, an indicating plate pivoted on said supporting device and having spaced lugs thereon, a pivoted arm connected to said feeler and mounted to swing with said feeler and having additional spaced lugs thereon, and a depending finger pivoted on said arm and freely swinging between the lugs on said arm, said finger being alternately engaged and moved by the lugs on said arm as said arm is rocked in one direction or the other by said feeler, and said finger alternately engaging the lugs on said indicating plate and being effective to reverse the position of said plate when engaged by a lug on said arm and to thereby cause a portion of said indicating plate to be engaged by said actuating member and to be moved thereby in a selected direction, together with said movable supporting device and said gate.

In testimony whereof I have hereunto affixed my signature.

THOMPSON BOYD.